United States Patent [19]

Shima

[11] Patent Number: 4,467,443
[45] Date of Patent: Aug. 21, 1984

[54] BIT ADDRESSABLE VARIABLE LENGTH MEMORY SYSTEM

[75] Inventor: George T. Shima, Del Mar, Calif.

[73] Assignee: Burroughs Corporation, Detroit, Mich.

[21] Appl. No.: 61,691

[22] Filed: Jul. 30, 1979

[51] Int. Cl.³ .................................................. G06F 13/00
[52] U.S. Cl. ............................................................. 364/900
[58] Field of Search ............................... 364/200, 900

[56] References Cited

U.S. PATENT DOCUMENTS

| | | | |
|---|---|---|---|
| 3,610,903 | 1/1969 | Stokes | 364/900 |
| 3,680,058 | 7/1972 | De Santis et al. | 364/200 |
| 3,739,352 | 6/1973 | Packard | 364/200 |
| 3,768,080 | 10/1973 | Boger et al. | 364/200 |
| 3,781,812 | 12/1973 | Wymore et al. | 364/200 |
| 4,020,470 | 4/1977 | Drimak | 364/200 |
| 4,023,023 | 5/1977 | Bourrez et al. | 364/200 |
| 4,090,237 | 5/1978 | Dimmick | 364/200 |
| 4,112,487 | 9/1978 | Nutter | 364/200 |
| 4,135,242 | 1/1979 | Ward et al. | 364/200 |
| 4,138,720 | 2/1979 | Chu et al. | 364/200 |
| 4,174,537 | 11/1979 | Chu et al. | 364/200 |
| 4,175,284 | 11/1979 | Shuraym | 364/200 |
| 4,189,768 | 2/1980 | Liptay et al. | 364/200 |
| 4,213,176 | 7/1980 | Cooper | 364/200 |
| 4,236,206 | 11/1980 | Strecker et al. | 364/200 |

Primary Examiner—Gareth D. Shaw
Assistant Examiner—John Mills
Attorney, Agent, or Firm—Charles J. Fassbender; Kevin R. Peterson

[57] ABSTRACT

Disclosed is a memory system for reading and writing variable length data fields. Each of the data fields are addressed by the combination of a word address, a bit address, and a field length. Internal to the memory system, a total of 2N cells are addressed by each word address where N is the maximum field length. But only a portion of the addressed cells are selectively enabled in response to the bit address and field length. An N bit shifter right justifies the output data from the selectively enabled cells, and also realigns right justified input data to be written into the selectively enabled cells.

11 Claims, 11 Drawing Figures

| BIT ADDRESS | FIELD LENGTH | WORD ADDR. LSB | ENABLE SIGNALS |
|---|---|---|---|
| 00000 | 00000 | 0 | 111....11111111100000000..00000 |
| 00000 | 00000 | 1 | 000....00000000011111......111 |
| 00011 | 00101 | 0 | 000111110000000000000...00000 |
| 00011 | 00101 | 1 | 000000000000000011110000...0 |

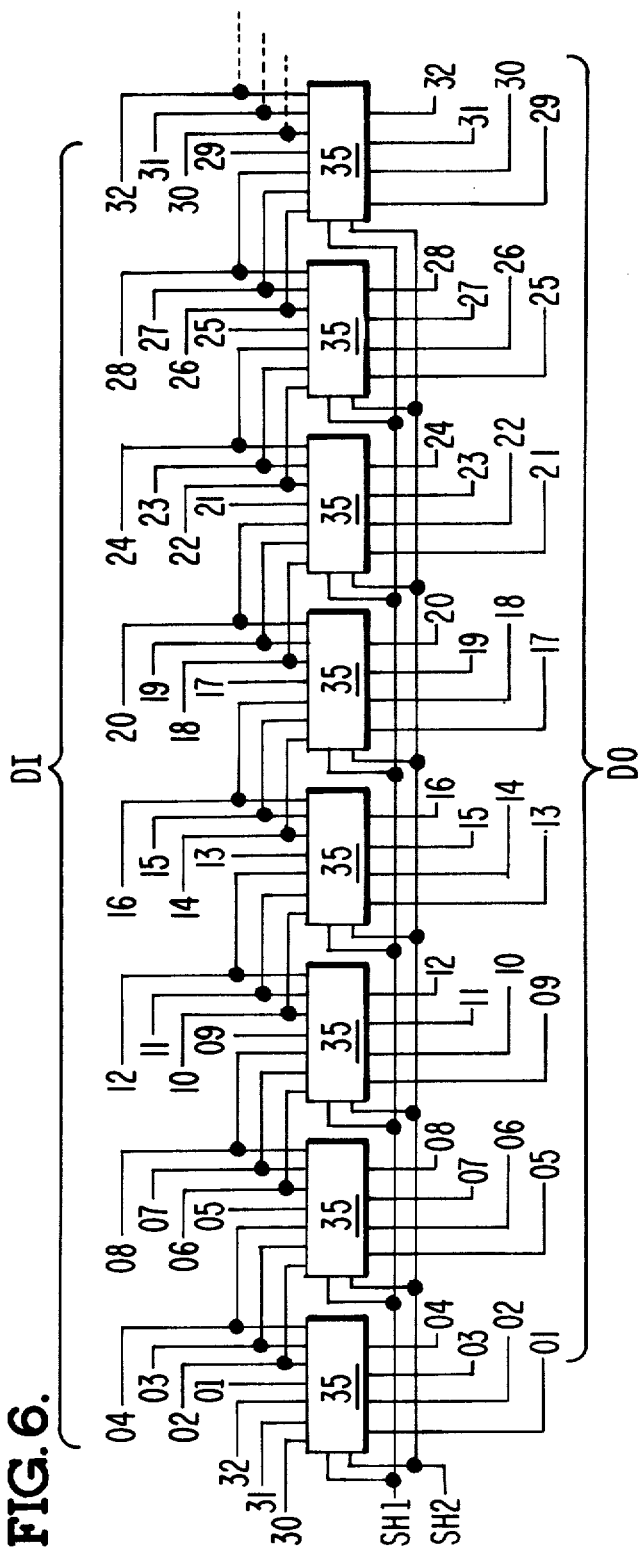

BIT ADDRESSABLE VARIABLE LENGTH MEMORY SYSTEM

BACKGROUND OF THE INVENTION

This invention relates to digital memory systems; and more particularly to, those memory systems which are bit addressable and have variable length data fields stored therein. In bit addressable memories, any single bit may be read from and/or written into the memory. Further, in bit addressable variable length memory systems, any number of contiguous bits starting with the singly addressed bit may be read from and/or written into the memory system.

An exemplary prior art bit addressable variable length memory system is described in U.S. Pat. No. 3,680,058 issued July 25, 1972. A block diagram of that memory system is shown in the patent at FIG. 7. That figure is described in the Detailed Description at column 6 and 7.

One unattractive aspect of the memory there disclosed however, is that it requires too much hardware for its implementation. In particular, that memory requires a register 60 and a shifter 61 which are twice as long as the maximum length field which can be read from the memory.

Thus for example, if the maximum length field that can be read is 64 bits long, then register 60 must be able to hold 128 bits and shifter 61 must be able to shift 128 bits. Clearly, a memory architecture which requires a shorter length for register 60 and shifter 61 would be a much more attractive design.

Another undesirable feature of U.S. Pat. No. 3,680,058 memory is that all writes thereto must be preceeded by a read. Clearly, this requirement substantially slows down the memory's operation. However, the reads are required by the design in order that the bits which are adjacent to those to be written can remain unchanged.

Therefore, a primary object of the invention is to provide an improved bit addressable variable length memory system.

Another object of the invention is to provide a bit addressable variable length memory system that uses substantially less hardware for its implementation than prior art designs used.

Still another object of the invention is to provide a bit addressable variable length memory system wherein writes to the memory are performed without any read therefrom.

BRIEF SUMMARY OF THE INVENTION

These and other objects are accomplished by a memory system that includes a word address translation circuit for receiving and translating a word address into first and second addresses representative of the word address. A first array of read/write memory cells are coupled to receive the first address for addressing the cells therein in groups of N where N is the maximum length of said field. Also, a second array of read/write memory cells are coupled to receive said second address for addressing the cells therein in groups of N.

Each of the arrays have N enable inputs for receiving respective enable signals that selectively enable said address cells. They also have N data outputs for generating thereon the bits from only the selectively enabled cells, and have N data inputs for writing data therefrom into only the selectively enabled cells.

Also included is an enable control circuit. It has 2N enable outputs respectively connected to the enable inputs of the memory arrays. In operation, it translates a bit address and a field length into the enable signals on said enable outputs. The number of enable signals generated is determined by the field length, and the subset of the 2N enable outputs on which the enable signals are generated is representative of the bit address.

An N bit shift also couples to the arrays. It shifts the output data read from the enabled cells, and shifts input data to be written to the enabled cells. The shifts are in a circular fashion and by a selectable amount in response to shift control signals.

A shift control circuit is also included. It translates the bit address into the shift control signals such that they direct the shifter to right justify the data on the data outputs of the enabled cells, and realign right justified input data to the input of the enabled cells.

BRIEF DESCRIPTION OF THE DRAWINGS

Various features and advantages of the invention disclosed herein will best be understood by reference to the following Detailed Description and accompanied drawings wherein:

FIG. 6 is a logic diagram illustrating in greater detail a portion of the shifter in the FIG. 1 memory system.

FIG. 7 is a table illustrating the operation of the shift control circuit of the FIG. 1 memory system.

DETAILED DESCRIPTION

Figure 1:
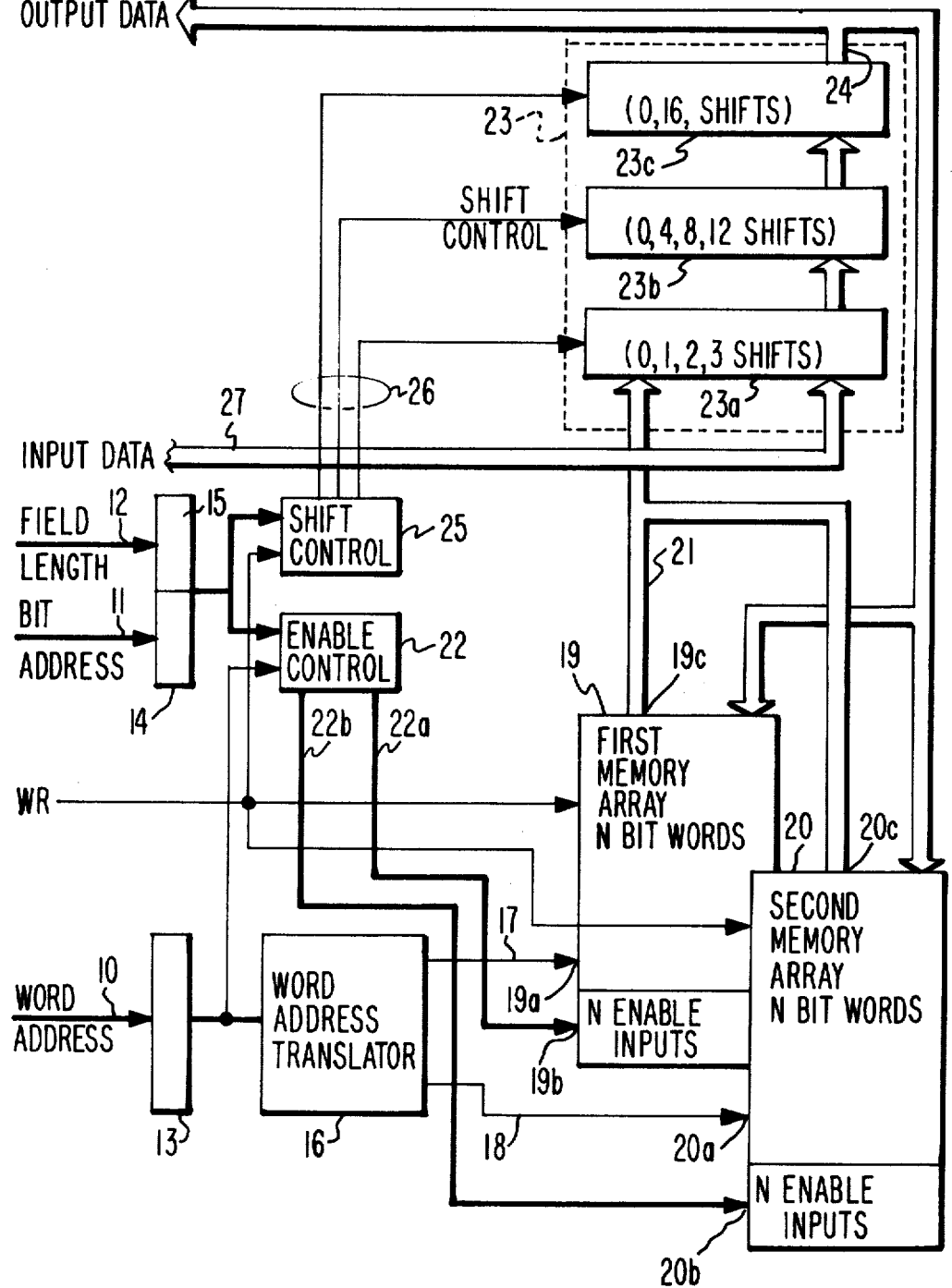
FIG. 1 is a block diagram of a memory system constructed according to the invention.

Referring now to FIG. 1, a preferred embodiment of a memory system that is constructed according to the invention will be described. In this memory system, variable length fields are addressed by the combination of word address signals, bit address signals, and field length signals. Those signals are generated by an external source (not shown) on leads 10, 11, and 12 respectively.

The signals on leads 10, 11, and 12 are latched in registers 13, 14, and 15 as illustrated. Register 13 has outputs which couple to a word address translator 16. Basically, the function of translator 16 is to translate the word address in register 13 into first and second addresses on leads 17 and 18 respectively. One preferred manner in which this translation is performed will be described shortly in conjunction with FIG. 2.

Leads 17 couple to address inputs 19a on a first array of memory cells 19; and leads 18 coupled to address inputs 20a on a second array of memory cells 20. Each address on inputs 19a addresses one group of N cells in array 19; and each address on inputs 20a addresses another group of N cells in array 20.

Arrays 19 and 20 also each have N enable inputs 19b and 20b, and N data outputs 19c and 20c respectively. Enable signals are applied to the enable inputs 19b and 20b to selectively enable the cells within those groups of N that are addressed via inputs 19a and 20a. Only those bits of the addressed cells which are selectively enabled are generated on the data outputs 19c and 20c.

An N bit data bus 21 connects the N data outputs 19c of the first array to corresponding outputs 20c of the second array. By this bus, corresponding bits from memory 19 and memory 20 are logically OR-ed into a single set of N bits.

The enable signals for arrays 19 and 20 are generated by an enable control circuit 22. Circuit 22 has N enable outputs 22a which couple respectively to the N enable inputs 19b of array 19; and has N other enable outputs 22b which couple respectively to the N enable inputs 20b of array 20.

In operation, control circuit 22 receives bit address signals from register 14, field length signals from register 15, and the least significant bit from register 13; and it translates those signals into the enable signals on outputs 22a and 22b. Basically, the number of enable signals generated is specified by the field length; and the subset of the two N enable outputs on which those enable signals are generated is determined by the bit address and least significant bit of the word address. This will be described in greater detail in conjunction with FIGS. 2 and 3.

The preferred embodiment of FIG. 1 also includes a shifter 23 coupled to receive the data signals on bus 21. Basically, shifter 23 operates to right justify the data bits that it receives from the bus. The right justified data bits are generated on an output data bus 24.

Shifter 23 achieves this justification by shifting its input data in a circular fashion from one through N-1 bit positions to the right. To accomplish this, shifter 23 preferably is constructed in sections which serially feed each other as illustrated in FIG. 1. Section 23a selectively shifts by 0, 1, 2, or 3 bit positions; section 23b selectively shifts by 0, 4, 8, or 12 bit positions; etc.

Additional sections are added as N increases. FIG. 1 illustrates shifter 23 where N equals thirty-two as an example. It has three sections 23a, 23b, and 23c which shift a total of from 0 to 31 bit positions.

Also included in the FIG. 1 memory is a shift control circuit 25. This circuit generates shift control signals on leads 26 which direct the operations of shifter 23. To accomplish that, circuit 26 receives the bit address signal and field length signals in registers 14 and 15. Then, it translates those signals into the shift control signals on leads 25. One preferred translation mechanism will be described in greater detail in conjunction with FIG. 3.

To write data into arrays 19 and 20, an N bit data input bus 27 is provided. Data on bus 27 is right justified, and shifter 23 operates to realign that data on bus 24 in accordance with the bit address and field length signals. This realignment allows data to be written into and read from memory arrays 19 and 20 in the same format for any particular bit address-field length combination.

For example, suppose one particular bit address and field length requires the data on bus 21 to be shifted one bit position to the right during a read from arrays 14 and 20. Then, that same bit address and field length will cause the data on bus 27 to be circular shifted N minus one positions to the left. This is the same as shifting the data on bus 27 one position to the right.

Figure 2:
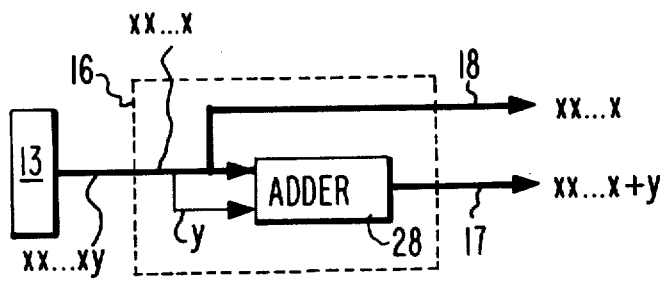
FIG. 2 is a block diagram illustrating in greater detail, the word address translator portion of the FIG. 1 memory system.

Referring now to FIG. 2, the structure and operation of one preferred embodiment of translator 16 will be described. In that figure, the word address signals which translator 16 receives from register 13 are illustrated as XX . . . XY. There, Y is the least significant bit of the address, and XX . . . X is the remaining portion thereof.

To form the second address for memory array 19, portion XX . . . X is simply passed onto leads 18. By comparison, to form the first address for array 20, portions XX . . . X is added to the least significant bit Y via an adder 28.

Thus, translator 16 operates to form the address on leads 18 always equal to the word address in register 13 divided by two. Also, the first address on leads 17 is equal to the word address divided by two when the word address is even. But, when the word address is odd, the first address is equal to the word address divided by two plus one.

Figure 3A:
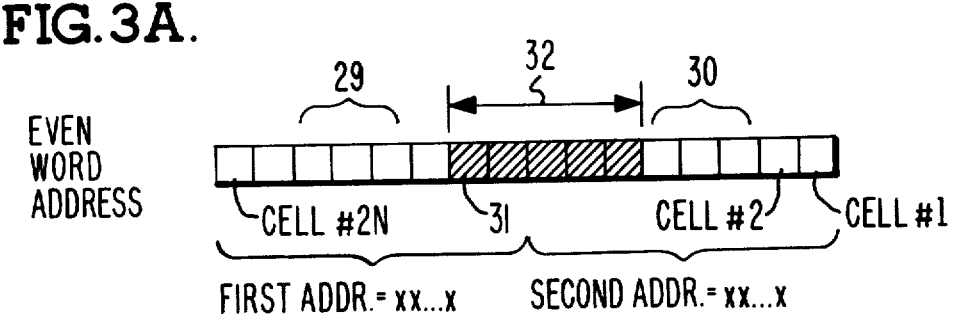
FIGS. 3A and 3B are schematic diagrams illustrating the memory cells which are addressed by the FIG. 2 word address translator.
Figure 3B:
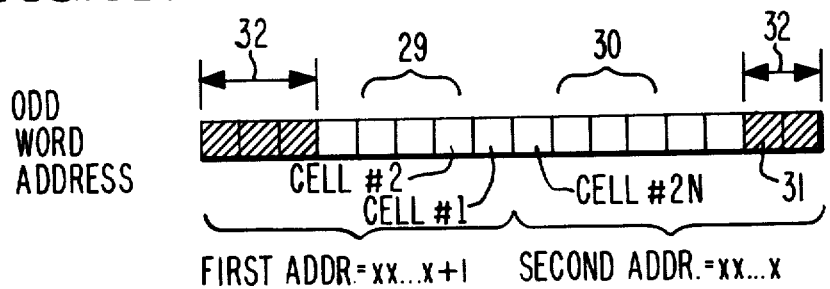

The two groups of N memory cells which are addressed by the signals on leads 17 and 18 are indicated via reference numerals 29 and 30 respectively in FIG. 3. In particular, FIG. 3A illustrates the two groups of memory cells that are addressed when the word address in register 13 is even. FIG. 3B in comparison, illustrates the two groups of N memory cells which are addressed when the word address in register 13 is odd.

Any number from 1 through N of these addressed memory cells 29 and 30 are selectively enabled onto bus 21 by means of the bit address signals and field length signals. The bit address signals determine the highest numbered cell (most significant cell) that is enabled. That cell is indicated by reference numeral 31. By comparison, the field length signals determine the total number of cells that are selectively enabled. Those cells are indicated by reference numeral 32.

Figures 4, 5:
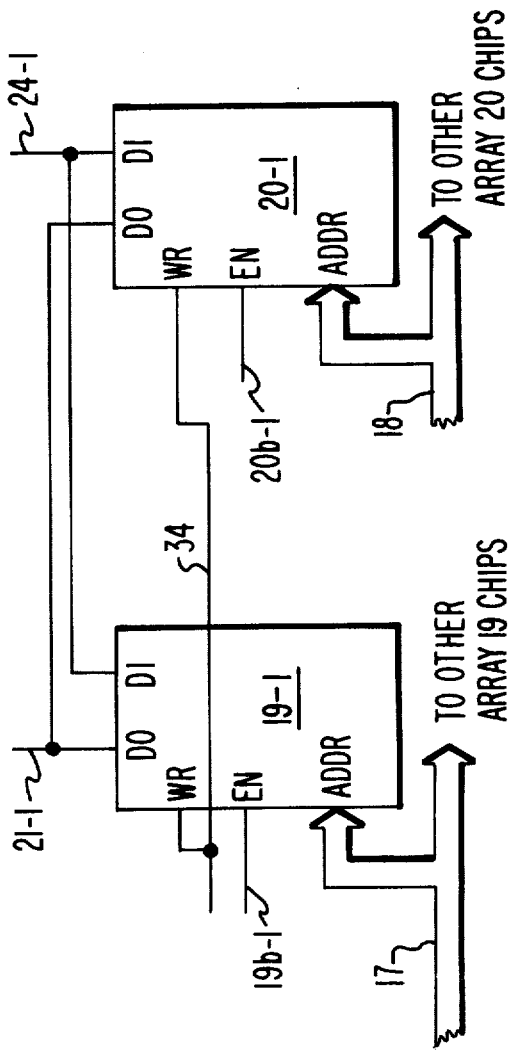
FIG. 4 is a table illustrating the operation of the enable control circuit of the FIG. 1 memory system.
FIG. 5 is a block diagram illustrating in greater detail a portion of the memory arrays of the FIG. 1 memory system.

Preferably, enable control circuit 22, which translates the bit address signals and field length signals into the desired enable signals, consists of a read only memory. Various examples of how this read only memory is programmed are illustrated in FIG. 4. There, the bit address signals, field length signals, and least significant bit of the word address all form address inputs to the read only memory. And the corresponding read only memory outputs are listed in the column labelled "enable signals".

Next, referring to FIG. 5, further details of memory arrays 19 and 20 will be described. Preferably, arrays 19 and 20 are comprised of a plurality of read/write memory chips which store multiple words of 1 bit each. In FIG. 5, reference numerals 19-1 and 20-1 respectively indicate one chip in array 19 and one chip in array 20. For example, chips 19-1 and 20-1 may contain 16,384 words of one bit each such as a 4164 chip which is manufactured by Texas Instruments.

A total of N such chips operate in parallel in array 19. Leads 17 connect to all of N of those chips. Similarly, a total of N such chips operate in parallel in array 20; and leads 18 connect to all of them.

By comparison, the enable inputs for each of the chips 19-1 and 20-1 are respectively connected to individual outputs of enable control circuit 22. This is indicated via reference numerals 19b-1 and 20b-1 in FIG. 5.

Also illustrated in FIG. 5, is one of the leads which forms bus 21. This is indicated via reference numeral 21-1. Similarly, reference numeral 24-1 indicates one of the leads which forms bus 24. Data on bus 24 is selectively written into the addressed and enabled cells by means of a write signal on a lead 34.

Referring now to FIG. 6, additional details of shifter 23 will be described. That figure is a detailed logic diagram of shifter section 23a. All of the other sections of shifter 23 are similarly constructed.

Basically, shifter section 23a is comprised of a plurality of four by one multiplexer chips 35. Signals DI01-DI32 represent 32 bits of data input signals to the chips. And signals DO01-DO32 represent 32 bits of data output signals from the chips.

The manner in which signals DI01-DI32 form signals DO01-DO32 is determined by the state of two shift control signals SH1 and SH2. A shift of one bit position occurs when signal SH1 is true; a shift of two bit positions occurs when signal SH2 is true; and a shift of three bit positions occurs when signals SH1 and SH2 are both true. Thus, for example, when signal SH1 is false and signal SH2 is true, signal DI31 forms signal DO01.

Preferably, shift control circuit 25, which forms the shift control signals SH1, SH2, etc., consists of a read only memory. Various examples of how this read only memory is programmed to translate the bit address signals, field length signals, and write signal into the desired shift control signals is illustrated in FIG. 7.

In that figure, signals SH1, SH2, SH4, SH8, and SH16 respectively command various sections of shifter 23 to perform right circular shifts of 1, 2, 4, 8, and 16 bit positions. The total shift through shifter 23 is then determined by the combination of shift control signals that are true. By this mechanism, data is right aligned in a read, and re-aligned to its original position is a write.

One preferred embodiment of the disclosed memory system has now been described in detail. In addition, various changes and modifications may be made to those details without departing from the nature and spirit of the invention. For example, memory arrays 19 and 20 may be constructed of read only memory chips instead of the read/write memory chips (as was described in conjunction with FIG. 5). To implement arrays 19 and 20 with read only chips, all of the FIG. 5 interconnections remain the same, except that lead 34 is eliminated.

Figure 8:
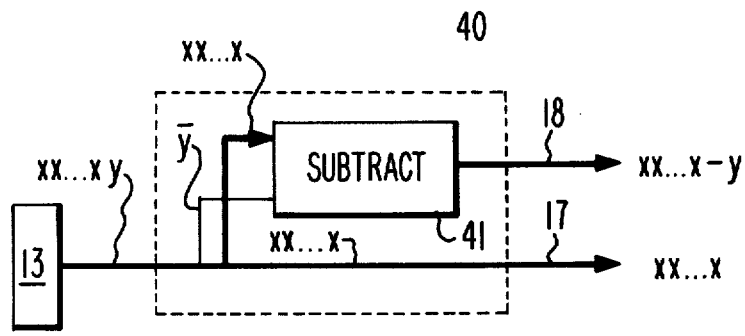
FIG. 8 is a block diagram illustrating an alternative embodiment for the word address translator in the FIG. 1 memory system.

In another modified embodiment, word address translator 16 (which was described in conjunction with FIG. 2) is replaced by a different word address translator 40 as illustrated in FIG. 8. Functionally, translator 40 operates to always form the address on leads 17 equal to the word address in register divided by two. Also, it operates to form the address on leads 18 equal to the word address in register 13 divided by two when that word address is odd, and to form the address on leads 18 equal to the word address in register 13 divided by two minus one when that word address is even.

This translation of the word address in register 13 preferably is performed by providing a subtracter 41 as illustrated in FIG. 8. One of the inputs to subtracter 41 is the complement of the least significant bit Y in register 13. The other input to subtracter 41 is the remaining bits XX . . . X in register 13.

Figure 9A:
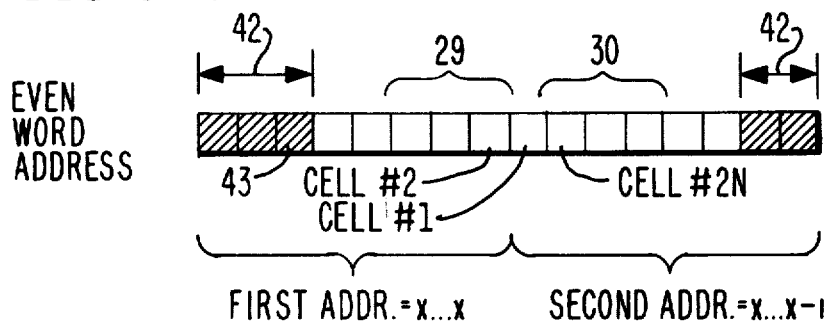
FIGS. 9A and 9B are schematic diagrams illustrating the memory cells which are addressed by the FIG. 8 word address translator.
Figure 9B:
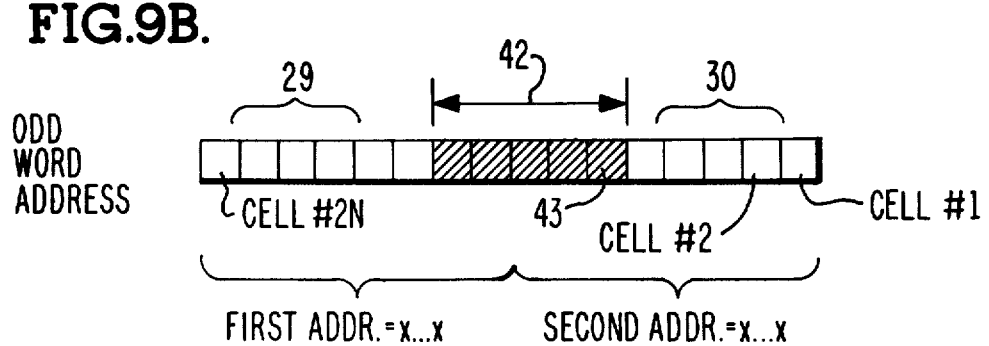

The operation of the memory system of FIG. 1 with the FIG. 8 word address translation circuit incorporated therein is illustrated in FIGS. 9a and 9b. There, reference numerals 29 and 30 again respectively indicate the two groups of N cells which are addressed in the memory arrays. As before, the total number of these addressed cells which are selectively enabled is controlled by the field length signals on leads 12. However, the bit address signals on leads 11 select the lowest numbered bit (least significant) of the field. This is indicated via reference numeral 43.

Various other changes may also be made to the above described details without departing from the nature and spirit of the invention. Therefore, the invention is not to be limited to said details but is defined by the appended claims.

What is claimed is:

1. A memory system for reading variable length fields therefrom and for writing variable length fields thereto; each of said fields being addressable by the combination of a word address, a bit address, and a field length; said memory system being comprised of:

word address translation means for translating said word address into first and second addresses representative of said word address;

a first array of read/write memory cells coupled to receive said first address for addressing a group of N cells therein where N is the maximum length of said field, and a second array of read/write memory cells coupled to receive said second address for also addressing the cells therein in groups of N;

each of said arrays having N enable inputs for receiving respective enable signals that selectively enable the individual cells in an addressed group to be read from and written into, having N data outputs for generating thereon the bits from only said selectively enabled cells, and having N data inputs for writing data therefrom into only said selectively enabled cells;

enable control means having 2N enable outputs respectively connected to said enable inputs of said memory arrays for translating said bit address and field length into said enable signals on said enable outputs such that during a read or write operation, the total number of cells that are enabled to be read from and written into equals said field length, and the subset of said 2N enable outputs on which said enable signals are generated is representative of said bit address;

an N bit shifter means coupled to said arrays for shifting output data read from said enabled cells and for shifting input data to be written to said enabled cells in a circular fashion by a selectable amount in response to shift control signals; and shift control means for translating said bit address into said shift control signals such that they direct said shifter means to right justify the data on said data outputs of said enabled cells and realign right justified input data to the data inputs of said enabled cells.

2. A memory system according to claim 1 wherein said first and second arrays of memory cells are comprised of a plurality of read/write memory chips with each of said chips containing a plurality of one bit words.

3. A memory system according to claim 1 wherein said word address translation means forms said first address equal to said word address divided by two when said word address is even, forms said first address equal to said word address divided by two plus one when said word address is odd, and always forms said second address equal to said word address divided by two.

4. A memory system according to claim 1 wherein said word address translation means forms said second address equal to said word address divided by two when said word address is odd, forms said second address equal to said word address divided by two minus one when said word address is odd, and always forms said first address equal to said word address divided by two.

5. A memory system according to claim 1 wherein said enable control means and said shift control means are comprised of a plurality of read only memory chips.

6. A memory system for reading variable length fields therefrom and for writing variable length fields thereto; each of said fields being addressable by the combination of a word address, a bit address, and a field length; said memory system being comprised of:

word address translation means for translating said word address into first and second addresses representative of said word address;

a first array of read/write memory cells coupled to receive said first address for addressing the cells therein in groups of N where N is the maximum length of said field, and a second array of memory cells coupled to receive said second address for also addressing the cells therein in groups of N;

each of said arrays having N enable inputs for receiving respective enable signals that selectively enable the individual cells of the addressed group to be read from and written into, having N data outputs for generating thereon the bits from only said selectively enabled cells, and having N data inputs for writing data therefrom into only said selectively enabled cells;

enable control means having 2N enable outputs respectively connected to said enable inputs of said memory arrays for translating said bit address and field length into said enable signals on said enable outputs such that during a read or write operation, the total number of enabled cells equals the number of enable signals generated which in turn equals said field length, and the subset of said 2N enable outputs on which said enable signals are generated is representative of said bit address.

7. A memory system according to claim 6 wherein said first and second arrays of memory cells are comprised of a plurality of memory chips with each of said chips containing a plurality of one bit words.

8. A memory system according to claim 6 wherein said word address translation means forms said first address equal to said word address divided by two when said word address is even, forms said first address equal to said word address divided by two plus one when said word address is odd, and always forms said second address equal to said word address divided by two.

9. A memory system according to claim 6 wherein said word address translation means forms said second address equal to said word address divided by two when said word address is odd, forms said second address equal to said word address divided by two minus one when said word address is odd, and always forms said first address equal to said word address divided by two.

10. A memory system according to claim 6 wherein said enable control means is comprised of a plurality of read only memory chips.

11. A memory system for reading variable length fields therefrom and for writing variable length fields thereto; each of said fields being addressable by the combination of a word address, a bit address, and a field length; said memory system being comprised of:

first and second memory arrays with memory cells in each array which are addressed in groups of N where N is the maximum length of said field;

each of the said arrays having N enable inputs for receiving respective enable signals which selectively enable the individual cells in the addressed group that are to be read from and written into; and an enable control means coupled to said arrays for translating said bit address and field length into said enable signals such that during a read or write operation, the total number of cells that are enabled to be read from and written into by the enable signals equals the field length, and the subset of said 2N enable outputs on which said enable signals are generated is representative of said bit address.

* * * * *